United States Patent
Gandhewar et al.

(10) Patent No.: US 11,720,473 B2
(45) Date of Patent: *Aug. 8, 2023

(54) SYSTEM AND METHOD FOR IMPLEMENTING A LOG FILE PROCESSING MODULE

(71) Applicant: JPMorgan Chase Bank, N.A., New York, NY (US)

(72) Inventors: Richa Rajendra Gandhewar, Jersey City, NJ (US); Mark Frederic Kirsch, Princeton, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,194

(22) Filed: Jun. 16, 2022

(65) Prior Publication Data

US 2022/0318126 A1    Oct. 6, 2022

Related U.S. Application Data

(63) Continuation of application No. 16/721,134, filed on Dec. 19, 2019, now Pat. No. 11,392,480.

(51) Int. Cl.
| | |
|---|---|
| *G06F 11/36* | (2006.01) |
| *G06F 11/34* | (2006.01) |
| *G06F 11/07* | (2006.01) |
| *G06F 16/14* | (2019.01) |
| *G06F 40/30* | (2020.01) |
| *G06F 40/205* | (2020.01) |

(52) U.S. Cl.
CPC ...... *G06F 11/3476* (2013.01); *G06F 11/0769* (2013.01); *G06F 11/0781* (2013.01); *G06F 16/148* (2019.01); *G06F 16/156* (2019.01); *G06F 40/205* (2020.01); *G06F 40/30* (2020.01)

(58) Field of Classification Search
CPC ............ G06F 11/0769; G06F 11/0781; G06F 11/3476; G06F 16/148; G06F 16/156; G06F 40/205; G06F 40/30
See application file for complete search history.

(56) References Cited

U.S. PATENT DOCUMENTS

| | | | |
|---|---|---|---|
| 10,884,842 B1 | 1/2021 | Ramachandran | |
| 10,887,157 B1 | 1/2021 | Fletcher et al. | |
| (Continued) | | | |

FOREIGN PATENT DOCUMENTS

| | | |
|---|---|---|
| CN | 108984362 | 12/2018 |
| CN | 111949633 | 11/2020 |

*Primary Examiner* — Chae M Ko
(74) *Attorney, Agent, or Firm* — Greenblum & Bernstein, P.L.C.

(57) ABSTRACT

Various methods, systems, apparatuses, and media for implementing a log file processing module are disclosed. A database stores a plurality of log files each having one or more lines with keywords for searching common keywords of errors and warnings appearing in testing an application. A receiver receives a log file from the database via a communication network. A processor operatively connected to the receiver and the database via the communication network dynamically and automatically summarizes contents of the log file by generating a reduced data file in a human readable format by automatically executing a summarization algorithm.

20 Claims, 7 Drawing Sheets

(56) References Cited

U.S. PATENT DOCUMENTS

| | | |
|---|---|---|
| 11,106,442 B1 | 8/2021 | Hsiao et al. |
| 2013/0171960 A1 | 7/2013 | Kandregula |
| 2015/0339376 A1* | 11/2015 | Wieweg ................ G06F 16/51 717/145 |
| 2018/0357299 A1* | 12/2018 | Miranda ............ G06F 16/2358 |
| 2019/0109809 A1* | 4/2019 | Wang .................... H04L 51/224 |
| 2019/0370347 A1 | 12/2019 | Levy et al. |

* cited by examiner

FIG. 5

GUI 520

RESULT 522

[2018/06/10-01:23 - 2018/06/10-06:13]  ERROR    3 occurrences of: Fatal :
Unable to complete task. System shutdown unexpectedly

[2018/06/09-23:23 - 2018/06/10-00:41]  WARN     2 occurrences of: Error :
Null Pointer Exception with Process

[2018/06/09-12:41 - 2018/06/09-20:41]  INFO     10 occurrences of: Warning :
are spoiled and need to be thrown away - Thread

[2018/06/10-08:47 - 2018/06/10-11:14]  INFO     2 occurrences of: Warning :
Indirect conversion from String to Long between Objects and

500

SYSTEM AND METHOD FOR IMPLEMENTING A LOG FILE PROCESSING MODULE

CROSS-REFERENCE TO RELATED APPLICATION

This is a Continuation of U.S. application Ser. No. 16/721,134 filed Dec. 19, 2019, the disclosure of which is hereby incorporated by reference in its entirety.

TECHNICAL FIELD

This disclosure generally relates to log file processing, and, more particularly, to methods, systems, and apparatuses for implementing a log file processing module for dynamically and automatically summarizing contents of log files by generating a reduced data file in a format that can be easily understood by a user (e.g., a software developer) thereby significantly reducing processing time of software testing and production.

BACKGROUND

Today, many companies or organizations having a large number of applications to be developed and produced face with difficulties with log files having warnings, errors, and exceptions. For example, today, log files with warnings are often ignored in a production environment. Similarly, today, log files with warnings, errors, and exceptions are often ignored in a non-production environment, e.g., during a User Acceptance Testing (UAT) which is a type of testing performed by the end user or the client to verify/accept a software system before moving the software application to the production environment. UAT may be done in the final phase of testing after functional, integration, and system testing is done.

The reasons for ignoring the log files with warnings, errors, and exceptions are often due to the fact that these log files may have millions of lines with thousands of warnings, errors, and exceptions. It may be nearly impossible for a human user to go through all of these warnings, errors, and exceptions in a timely manner and react to the information during the production environment or during the UAT phase. It may be very useful for the software developers to see warnings, errors, and/or exceptions as this was their intent when writing the code to print warnings, errors, and/or exceptions. Software developers often expect someone to review this information. However, due to millions of lines in log files with thousands of bespoke warnings and errors with various parameters, these warnings and errors are often being ignored.

SUMMARY

In view of the foregoing, it would be desirable to provide a solution for dynamically and automatically processing log files and summarizing contents of log files by generating a reduced data file in a format that can be easily understood by a user (e.g., a software developer) in a very short amount of time, i.e., within seconds, which overcomes the above-described deficiencies and shortcomings.

The present disclosure, through one or more of its various aspects, embodiments, and/or specific features or sub-components, provides, among others, various systems, servers, devices, methods, media, programs, and platforms for implementing a log file processing module for automatically summarizing contents of log files by generating a reduced data file in a format that can be easily understood by a user (e.g., a software developer) thereby significantly reducing processing time of software application testing and production, but the disclosure is not limited thereto. The present disclosure, through one or more of its various aspects, embodiments, and/or specific features or sub-components, also provides, among others, various systems, servers, devices, methods, media, programs, and platforms for implementing a log file processing module for dynamically and automatically summarizing warnings, errors, exceptions, etc., associated with software application testing and production in a format having a significantly smaller data set that is easily understandable by a user (e.g., a software developer) thereby significantly reducing processing time of software application testing, developments, and productions, but the disclosure is not limited thereto. According to the context of the exemplary embodiments of the instant disclosure, summarizing the contents of the log files into a significantly reduced data file may also help lower the storage requirements of a database. In addition, according to the context of the exemplary embodiments of the instant disclosure, in summarizing the contents of the log files, the log file processing module disclosed herein does not need to have any knowledge of data in a log file, rather just requires words to be used for searching common keywords of errors and warnings appearing in testing an application.

According to an aspect of the present disclosure, a method for implementing a log file processing module for dynamically and automatically summarizing contents of a log file by utilizing one or more processors and one or more memories is disclosed. The method may include: providing a database that stores a plurality of log files each having one or more lines with keywords for searching common keywords of errors and warnings appearing in testing an application; receiving a log file from the database via a communication network; and dynamically and automatically summarizing contents of the log file by generating a reduced data file in a human readable format by automatically executing a summarization algorithm. The summarization algorithm may include: for each line of the log file, reading the line and parsing the line; creating word tokens from the parsed line by utilizing a series of delimiters and designating the word tokens from the parsed line as new_words; searching for a current result in results; when it is determined that the current result is not empty, and includes an array of words called current_words and an appearance count of the array called current_words_count, taking an intersection of the current_words from the current result and the new_words and designating the intersection words as intersection_words; when it is determined that the intersection words is equal to or more than a predetermined percentage match with the current_words, removing the current_words from results; adding a new result with the new intersection_words; setting intersection_words count to be 1 plus the current_words_count; and iterating to the next line of log file.

According to another aspect of the present disclosure, when it is determined that the intersection_words is less than the predetermined percentage match with the current_words, the method may further include: adding the new_words to the results; setting the count of the new_words to 1; and iterating to the next line of the log file.

According to yet another aspect of the present disclosure, the keywords may comprise one or more of the following words appearing in testing the application: warning, error, fatal, and info, but the disclosure is not limited thereto.

According to a further aspect of the present disclosure, when it is determined that the current result is empty, the method may further include: adding the new_words to the results; setting the count of the new_words to 1; and iterating to the next line of the log file.

According to an additional aspect of the present disclosure, the method may further include: receiving a plurality of log files from the database via the communication network; and dynamically and automatically summarizing contents of all of the log files simultaneously by generating a reduced data file in a human readable format by automatically executing the summarization algorithm.

According to yet another aspect of the present disclosure, the predetermined percentage may be a value between about 70% to about 90% of the current_words, but the disclosure is not limited thereto.

According to a further aspect of the present disclosure, the predetermined percentage may be about 75% of the current_words, but the disclosure is not limited thereto.

According to an additional aspect of the present disclosure, a system for implementing a log file processing module for dynamically and automatically summarizing contents of a log file is disclosed. The system may include a database that stores a plurality of log files each having one or more lines with keywords for searching common keywords of errors and warnings appearing in testing an application; a receiver configured to receive a log file from the database via a communication network; and a processor coupled to the receiver and the database via the communication network, wherein the processor may be configured to dynamically and automatically summarize contents of the log file by generating a reduced data file in a human readable format by automatically executing a summarization algorithm including: for each line of the log file, reading the line and parsing the line; creating word tokens from the parsed line by utilizing a series of delimiters and designating the word tokens from the parsed line as new_words; searching for a current result in results; when it is determined that the current result is not empty, and includes an array of words called current_words and an appearance count of the array called current_words_count, taking an intersection of the current_words from the current result and the new_words and designating the intersection words as intersection_words; when it is determined that the intersection_words is equal to or more than a predetermined percentage match with the current_words, removing the current_words from results; adding a new result with the new intersection_words; setting intersection_words count to be 1 plus the current_words_count; and iterating to the next line of log file.

According to yet another aspect of the present disclosure, when it is determined that the intersection_words is less than the predetermined percentage match with the current_words, the processor may be further configured to: add the new_words to the results; set the count of the new_words to 1; and iterate to the next line of the log file.

According to a further aspect of the present disclosure, when it is determined that the current result is empty, the processor may be further configured to: add the new_words to the results; set the count of the new_words to 1; and iterate to the next line of the log file.

According to an aspect of the present disclosure, the processor may be further configured to: receive a plurality of log files from the database via the communication network; and dynamically and automatically summarize contents of all of the log files simultaneously by generating a reduced data file in a human readable format by automatically executing the summarization algorithm.

According to an additional aspect of the present disclosure, a non-transitory computer readable medium configured to store instructions for implementing a log file processing module for dynamically and automatically summarizing contents of a log file is disclosed. The instructions, when executed, may cause a processor to perform the following: access a database that stores a plurality of log files each having one or more lines with keywords for searching common keywords of errors and warnings appearing in testing an application; and dynamically and automatically summarize contents of the log file by generating a reduced data file in a human readable format by automatically executing a summarization algorithm including: for each line of the log file, reading the line and parsing the line; creating word tokens from the parsed line by utilizing a series of delimiters and designating the word tokens from the parsed line as new_words; searching for a current result in results; when it is determined that the current result is not empty, and includes an array of words called current_words and an appearance count of the array called current_words_count, taking an intersection of the current_words from the current result and the new_words and designating the intersection words as intersection_words; when it is determined that the intersection_words is equal to or more than a predetermined percentage match with the current_words, removing the current_words from results; adding a new result with the new intersection_words; setting intersection_words count to be 1 plus the current_words_count; and iterating to the next line of log file.

According to a further aspect of the present disclosure, when it is determined that the intersection words is less than the predetermined percentage match with the current_words, the instructions, when executed, may cause the processor to further perform the following: add the new_words to the results; set the count of the new_words to 1; and iterate to the next line of the log file.

According to yet another aspect of the present disclosure, when it is determined that the current result is empty, the instructions, when executed, may cause the processor to further perform the following: add the new_words to the results; set the count of the new_words to 1; and iterate to the next line of the log file.

According to a further aspect of the present disclosure, the instructions, when executed, may cause the processor to further perform the following: receive a plurality of log files from the database via the communication network; and dynamically and automatically summarize contents of all of the log files simultaneously by generating a reduced data file in a human readable format by automatically executing the summarization algorithm.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 illustrates a graphical user interface (GUI) that displays a summarized reduced data file generated by a log file processing module in accordance with an exemplary embodiment.

DETAILED DESCRIPTION

Figure 1:
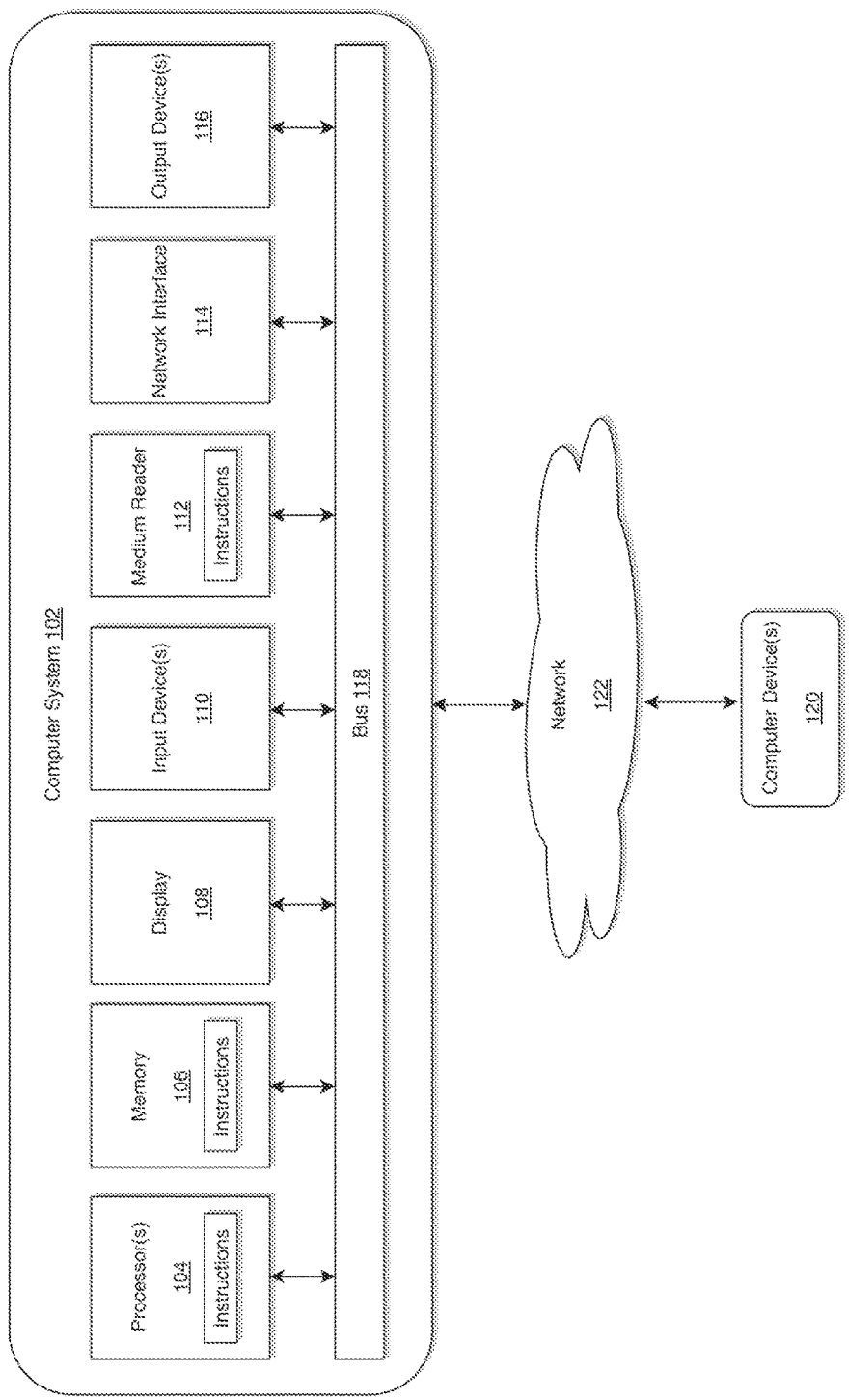
FIG. 1 illustrates a computer system for implementing a log file processing device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Terms such as "substantially," "about," or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments may provide optimized processes of implementing a log file processing module for automatically and dynamically summarizing contents of log files by generating a reduced data file in a format that can be easily understood by a user (e.g., a software developer) thereby significantly reducing processing time of software application testing and production, but the disclosure is not limited thereto. As described herein, various embodiments may also provide optimized processes of implementing a log file processing module for dynamically and automatically summarizing warnings, errors, exceptions, etc., associated with software application testing and production in a format having a significantly smaller data set that is easily understandable by a user (e.g., a software developer) thereby significantly reducing processing time of software application testing, developments, and productions, but the disclosure is not limited thereto. According to the context of the exemplary embodiments of the instant disclosure, automatically summarizing the contents of the log files into a significantly reduced data file may also help lower the storage requirements of a database. In addition, according to the context of the exemplary embodiments of the instant disclosure, in automatically summarizing the contents of the log files, the log file processing module disclosed herein does not need to have any knowledge of data in a log file, rather just requires keywords to be used for searching common keywords of errors and warnings appearing in testing an application.

Figure 2:
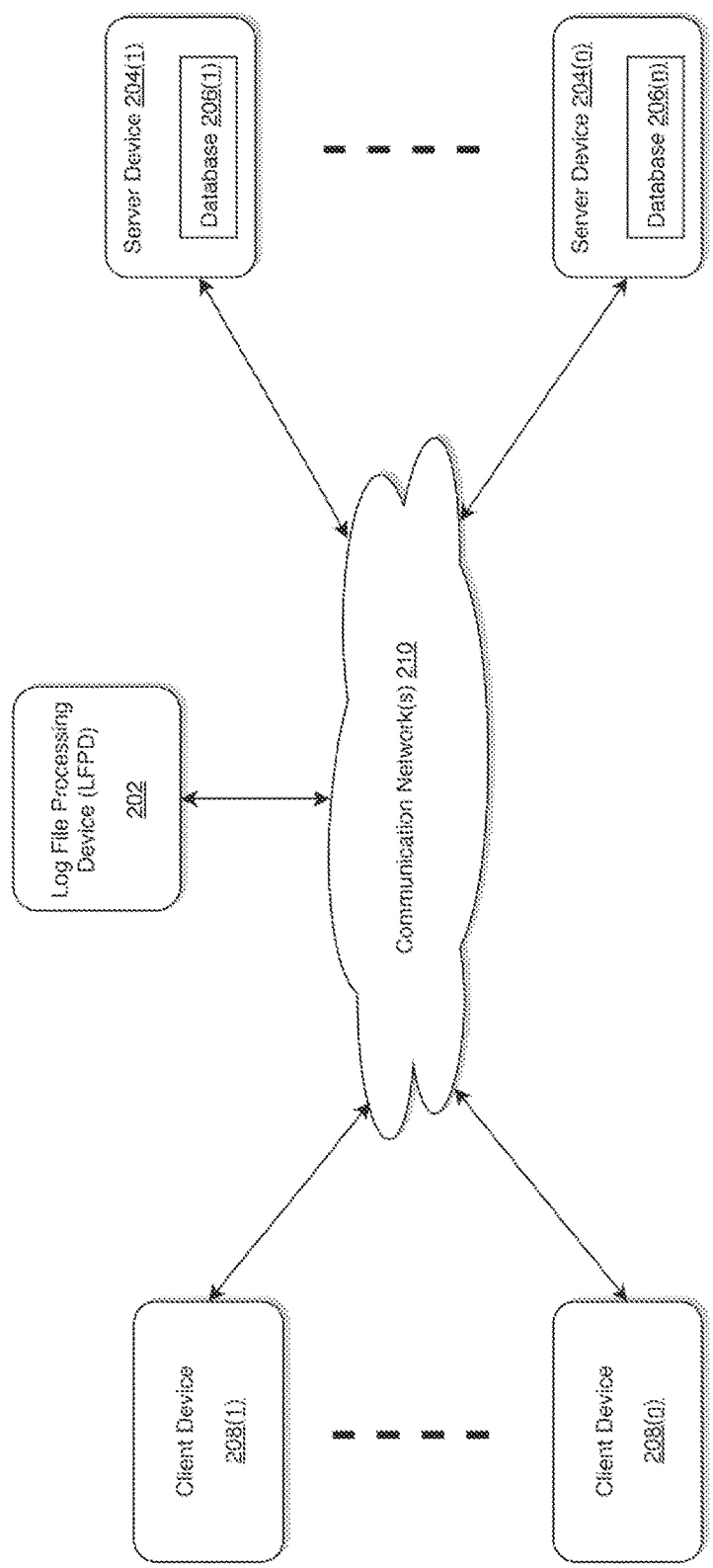
FIG. 2 illustrates an exemplary diagram of a network environment with a log file processing device in accordance with an exemplary embodiment.

Referring to FIG. 2, a schematic of an exemplary network environment 200 for implementing a log file processing device (LFPD) of the instant disclosure is illustrated.

Conventional system, that does not implement an LFPD of the instant disclosure, may not be able to dynamically and automatically process log files and summarize contents of log files by generating a reduced data file in a format that can be easily understood by a user (e.g., a software developer) in a very short amount of time, i.e., within seconds. Indeed, software developers utilizing conventional system routinely ignore warnings and errors in log files because it is nearly impossible for the developers to review the millions of lines in log files with thousands of bespoke warnings and errors with various parameters, thereby significantly reducing quality of software testing processes and software productions.

According to exemplary embodiments, the above-described problems associated with conventional system may be overcome by implementing an LFPD 202 having a log file processing module as illustrated in FIG. 2. The LFPD 202 may be the same or similar to the computer system 102 as described with respect to FIG. 1.

The LFPD 202 may store one or more applications that can include executable instructions that, when executed by the LFPD 202, cause the LFPD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LFPD 202 itself, may be located in virtual server(s) running in a cloud-based computing environment rather than being tied to one or more specific physical network computing devices. Also, the application(s) may be running in one or more virtual machines (VMs) executing on the LFPD 202. Additionally, in one or more embodiments of this technology, virtual machine(s) running on the LFPD 202 may be managed or supervised by a hypervisor.

In the network environment 200 of FIG. 2, the LFPD 202 is coupled to a plurality of server devices 204(1)-204(n) that hosts a plurality of databases 206(1)-206(n), and also to a plurality of client devices 208(1)-208(n) via communication network(s) 210. A communication interface of the LFPD 202, such as the network interface 114 of the computer system 102 of FIG. 1, operatively couples and communicates between the LFPD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LFPD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LFPD 202 may be a standalone device or integrated with one or more other devices or apparatuses, such as one or more of the server devices 204(1)-204(n), for example. In one particular example, the LFPD 202 may be hosted by one of the server devices 204(1)-204(n), and other arrangements are also possible. Moreover, one or more of the devices of the LFPD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LFPD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the LFPD 202 that may be configured for automatically summarizing contents of log files by generating a reduced data file in a format that can be easily understood by a user (e.g., a software developer) thereby significantly reducing processing time of software application testing and production, but the disclosure is not limited thereto. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the LFPD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the LFPD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LFPD 202, the server devices 204(1)-204(n), or the client devices 208(1)-208(n), for example, may be configured to operate as virtual instances on the same physical machine. For example, one or more of the LFPD 202, the server devices 204(1)-204(n), or the client devices 208(1)-208(n) may operate on the same physical device rather than as separate devices communicating through communication network(s) 210. Additionally, there may be more or fewer LFPDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
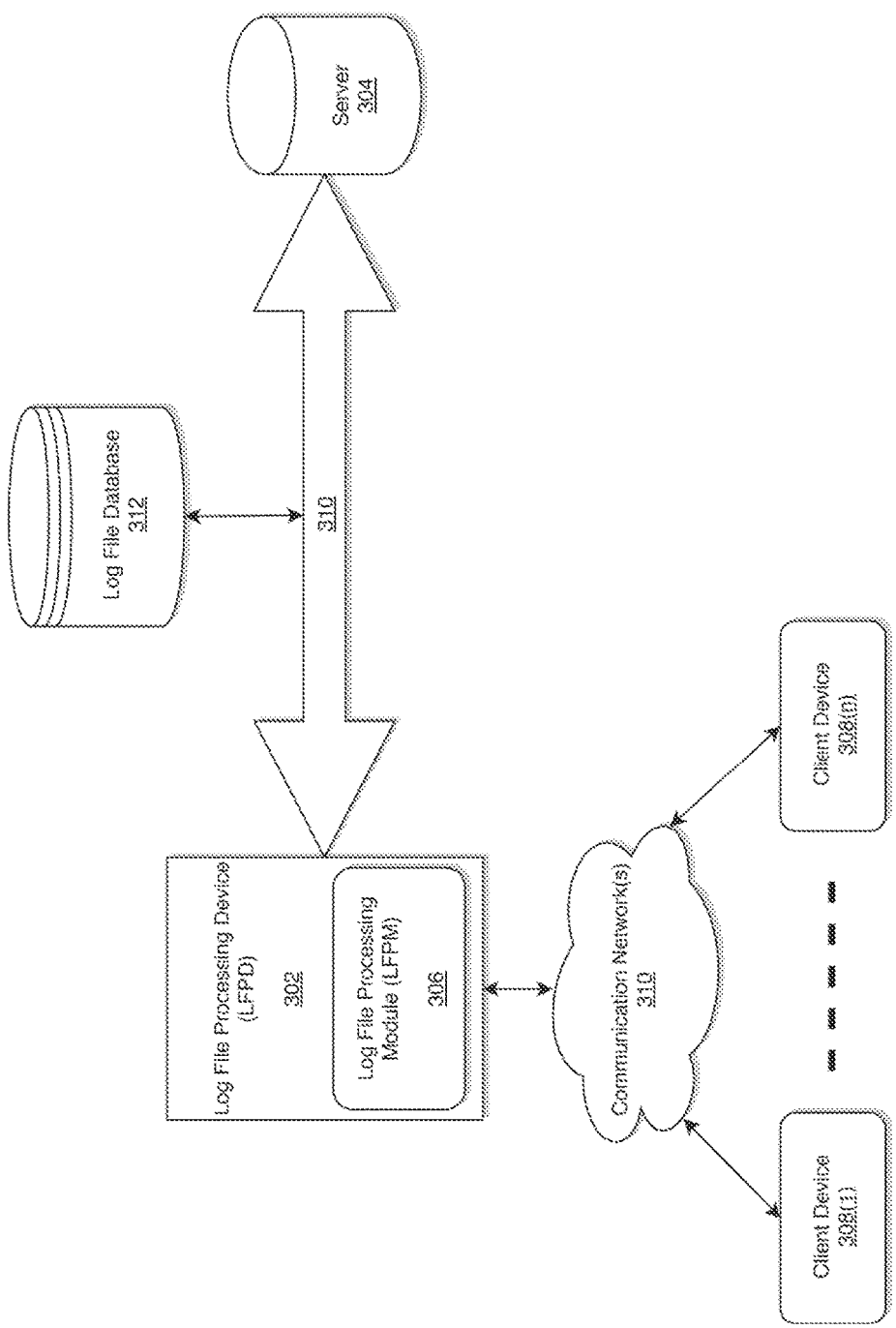
FIG. 3 illustrates a system diagram for implementing a log file processing device of FIG. 2 with a log file processing module in accordance with an exemplary embodiment.

FIG. 3 illustrates a system diagram for implementing an LFPD with a log file processing module (LFPM) in accordance with an exemplary embodiment.

As illustrated in FIG. 3, the LFPD 302 including the LFPM 306 may be connected to a server 304 and a log file database 312 via a communication network 310. The LFPD 302 may also be connected to a first client device 308(1) and a second client device 308(n) via the communication network 310, but the disclosure is not limited thereto.

According to exemplary embodiment, the LFPD 302 is described and shown in FIG. 3 as including the LFPM 306, although it may include other rules, policies, modules, databases, or applications, for example. According to exemplary embodiments, the log file database 312 may be embedded within the LFPD 302 or within the LFPM 306. According to exemplary embodiments, the log file database 312 may store a plurality of log files each having one or more lines with keywords for searching common keywords of errors and warnings appearing in testing an application, but the disclosure is not limited thereto.

As will be described below, the LFPD 302 may be configured to access the log file database 312 and dynamically and automatically summarize contents of the log file by generating a reduced data file in a human readable format by automatically executing a summarization algorithm. According to exemplary embodiments, as will be described below, the LFPD 302 may be configured to control the LFPM 306 to execute a data summarization algorithm that may include: for each line of the log file, reading the line and parsing the line; creating word tokens from the parsed line by utilizing a series of delimiters and designating the word tokens from the parsed line as new_words; searching for a current result in results; when it is determined that the current result is not empty, and includes an array of words called current_words and an appearance count of the array called current_words_count, taking an intersection of the current_words from the current result and the new_words and designating the intersection words as intersection_words; when it is determined that the intersection_words is equal to or more than a predetermined percentage match with the current_words, removing the current_words from results; adding a new result with the new intersection_words; setting intersection_words count to be 1 plus the current_words_count; and iterating to the next line of log file. According to exemplary embodiments, the LFPM 306 may be configured as a CPU to perform each of the functions mentioned above associated with the summarization algorithm.

The first client device 308(1) and the second client device 308(n) are illustrated as being in communication with the LFPD 302. In this regard, the first client device 308(1) and the second client device 308(n) may be "clients" of the LFPD 302 and are described herein as such. Nevertheless, it is to be known and understood that the first client device 308(1) and/or the second client device 308(n) need not necessarily be "clients" of the LFPD 302, or any entity described in association therewith herein. Any additional or alternative relationship may exist between either or both of the first client device 308(1) and the second client device 308(n) and the LFPD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either or both of the first client device 308(1) and the second client device 308(n) may communicate with the LFPD 302 via broadband or cellular communication. Of course, these embodiments are merely exemplary and are not limiting or exhaustive. According to exemplary embodiments, each of the client device 308(1)-308(n) may be configured to receive results output from the LFPD 302 and/or the LFPM 306.

Figure 4:
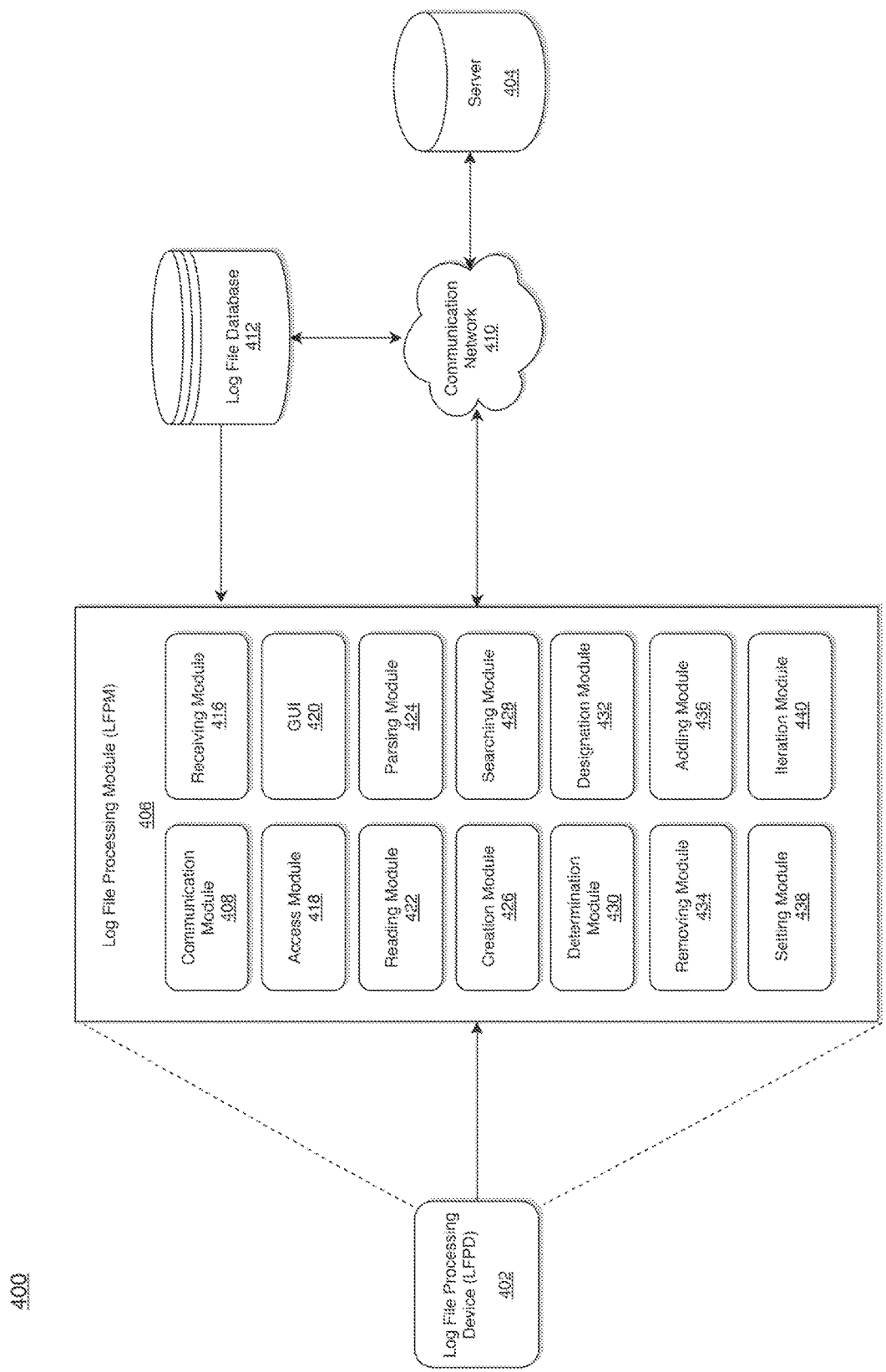
FIG. 4 illustrates a system diagram for implementing a log file processing module of FIG. 3 in accordance with an exemplary embodiment.

FIG. 4 illustrates a system diagram for implementing a log file processing module of FIG. 3 in accordance with an exemplary embodiment. As illustrated in FIG. 4, the system 400 may include an LFPD 402 within which an LFPM 406 may be embedded, a log file database 412, a server 404, and a communication network 410.

As illustrated in FIG. 4, the LFPM 406 may include a communication module 408, a receiving module 416, an access module 418, a graphical user interface (GUI) 420, a reading module 422, a parsing module 424, a creation module 426, a searching module 428, a determination module 430, a designation module 432, a removing module 434, an adding (appending) module 436, a setting module 438, and an iteration module 440. According to exemplary embodiments, the log file database 412 may also be embedded within the LFPM 406 or within the LFPD 402, and the LFPD 402 may include various systems that are managed and operated by a company or an organization. For example, software development and production teams of a company or an organization may utilize the LFPD 402 to automatically and dynamically summarize contents of a log file into a human readable reduced data format.

According to exemplary embodiments, each of the communication module 408, receiving module 416, access module 418, reading module 422, parsing module 424, creation module 426, searching module 428, determination module 430, designation module 432, removing module 434, adding (appending) module 436, setting module 438, and the iteration module 440 may be implemented by microprocessors or similar, they may be programmed using software (e.g., microcode) to perform various functions discussed herein and may optionally be driven by firmware and/or software. Alternatively, each of the communication module 408, receiving module 416, access module 418, reading module 422, parsing module 424, creation module 426, searching module 428, determination module 430, designation module 432, removing module 434, adding (appending) module 436, setting module 438, and the iteration module 440 may be implemented by dedicated hardware, or as a combination of dedicated hardware to perform some functions and a processor (e.g., one or more programmed microprocessors and associated circuitry) to perform other functions. Also, according to exemplary embodiments, each of the communication module 408, receiving module 416, access module 418, reading module 422, parsing module 424, creation module 426, searching module 428, determination module 430, designation module 432, removing module 434, adding (appending) module 436, setting module 438, and the iteration module 440 may be physically separated into two or more interacting and discrete modules without departing from the scope of the inventive concepts.

The process may be executed via the communication network 410, which may comprise plural networks as described above. For example, in an exemplary embodiment, the various components of the LFPM 406 may communicate with the server 404, the log file database 412, via the communication module 408 and the communication network 410. Of course, these embodiments are merely exemplary and are not limiting or exhaustive.

According to exemplary embodiments, the communication module 408 may also be configured to establish a link between the log file database 412 and the server 404 via the communication network 410.

According to exemplary embodiments, the log file database 412 may store a plurality of log files each having one or more lines with keywords for searching common keywords of errors and warnings appearing in testing an application, but the disclosure is not limited thereto. The receiving module 416 may be configured to receive a log file from the database 412 via the communication network 410 and the communication module 408.

According to exemplary embodiments, the LFPM 406 may be configured to perform functions of a CPU that may be operatively coupled to the receiving module 416 and the log file database 412 via the communication network 410 and the communication module 408. According to exemplary embodiments, the CPU may be configured to dynamically and automatically summarize contents of the log file received from the log file database 412 by generating a reduced data file in a human readable format by automatically executing a summarization algorithm.

According to exemplary embodiments, the CPU may constitute the access module 418, reading module 422, parsing module 424, creation module 426, searching module 428, determination module 430, designation module 432, removing module 434, adding (appending) module 436, setting module 438, and the iteration module 440 as illustrated in FIG. 4, but the disclosure is not limited thereto. According to exemplary embodiments, the summarization algorithm may be executed by the combination of functions executed by each of the access module 418, reading module 422, parsing module 424, creation module 426, searching module 428, determination module 430, designation module 432, removing module 434, adding (appending) module 436, setting module 438, and the iteration module 440.

For example, according to an aspect of the present disclosure, for each line of the log file, the reading module 422 may be configured to read the line, the parsing module 424 may be configured to parse the line that has been read by the reading module 422, and the creation module 426 may be configured to create word tokens from the parsed line parsed by the parsing module 424 by utilizing a series of delimiters and designating the word tokens from the parsed line as new_words. According to exemplary embodiments, the default delimiters may be a "space," but the disclosure is not limited thereto. Other commonly used delimiters may also be utilized to generate the word tokens.

According to exemplary embodiments, the searching module 428 may be configured to search for a current result in results. When the determination module 430 determines that the current result is empty, the adding module 436 may be configured to add the new_words to the results, the setting module 438 may be configured to set the count of the new_words to 1, and the iteration module 440 may be configured to iterate to the next line of the log file.

According to exemplary embodiments, when the determination module 430 determines that the intersection_words is equal to or more than a predetermined percentage match with the current_words, the removing module 434 may be configured to remove the current_words from results, the adding module 436 may be configured to add (append) a new result with the new intersection_words, the setting module 438 may be configured to set intersection_words count to be 1 plus the current_words_count, and iteration module 440 may be configured to iterate to the next line of the log file.

According to exemplary embodiments, when the determination module 430 determines that the intersection_words is less than the predetermined percentage match with the current_words, the adding module 436 may be configured to add the new_words to the results; the setting module 438 may be configured to set the count to 1; and the iteration module 440 may be configured to iterate to the next line of the log file.

According to exemplary embodiments, when the determination module 430 determines that the current result is empty, the adding module 436 may be configured to add the new_words to the results; the setting module 438 may be configured to set the count to 1; and the iteration module 440 may be configured to iterate to the next line of the log file.

According to exemplary embodiments, the keywords may comprise one or more of the following words appearing in testing the application: warning, error, fatal, and info, but the disclosure is not limited thereto.

According to exemplary embodiments, when the determination module 430 determines that the current result is empty, the adding module 436 may be configured to add the new_words to the results; the setting module 438 may be configured to set the count to 1; and the iterating module 440 may be configured to iterate to the next line of the log file.

According to exemplary embodiments, the predetermined percentage may be a value between about 70% to about 90% of the current_words, but the disclosure is not limited thereto. For example, according to exemplary embodiments, the predetermined percentage may be about 75% of the current_words, but the disclosure is not limited thereto.

The non-limiting exemplary summarization algorithm will be described below.

For example, according to exemplary embodiments, initially, the setting module 438 of the LFPM 406 may be configured to set all results to empty as: Result={null}. Then the reading module 422 may be configured to start reading each line of the log file. For example, if the reading module 422 reads a line that is not empty (null), the parsing module 424 may be configured to parse the words of the line by using "space" as delimiters. For example, if the reading module 422 reads a line that includes the words "Red delicious apples are spoiled and need to be thrown away" in thread 1 of the log file, the initial result will include as follows:

Result={null}Red delicious apples are spoiled and need to be thrown away–Thread 1

Then, the parsing module 424 may parse the line that includes "Red delicious apples are spoiled and need to be thrown away" into word tokens of "Red," "delicious," "apples," "are," "spoiled," "and," "need," "to," "be," "thrown," and "away" using space as delimiters. Since the initial result is empty, the adding module 436 may add these word tokens as "new_words" to the results, and the setting module 438 may set the appearance count of the new_words (array of the words "Red delicious apples are spoiled and need to be thrown away") to "1." Thus, the result will now include as follows:

Result={"Red delicious apples are spoiled and need to be thrown away–Thread 1",1}

After that, the iteration module 440 may continue to iterate to the next line. For example, when the determination module 430 determines that the current result is not empty, and includes an array of words called current_words and an appearance count of the array called current_words_count (e.g., Result={"Red delicious apples are spoiled and need to be thrown away–Thread 1", 1}, the designation module 432 may be configured to take an intersection of the current_words from the current result and the new_words and may be configured to designate the intersection words as intersection_words.

For example, if the next line read by the reading module 422 again reads "Red delicious apples are spoiled and need to be thrown away," which appears in thread 2 of the log file, the parsing module 424 may again parse the line just read by the reading module 422 from thread 2 that includes "Red delicious apples are spoiled and need to be thrown away" into word tokens of "Red," "delicious," "apples," "are," "spoiled," "and," "need," "to," "be," "thrown," and "away" using space as delimiters and set them again as new_words. Since the determination module 430 determines that the current result is not empty, and includes an array of words called current_words and an appearance count of the array called current_words_count (e.g., {Result="Red delicious apples are spoiled and need to be thrown away–Thread 1", 1}, the designation module 432 may be configured to take an intersection of the current_words from the current result and the new_words and may be configured to designate the intersection words as intersection_words.

In this above example, since there is a 100% match (meaning exactly the same words) with the current_words in the current result (Red delicious apples are spoiled and need to be thrown away) and the new_words (Red delicious apples are spoiled and need to be thrown away) generated after parsing the next line (thread 2 of the log file), the intersection_words will also include the exact same words (Red delicious apples are spoiled and need to be thrown away). When the determination module 430 determines that the intersection_words is equal to or more than a predetermined percentage (i.e., 70%) match with the current_words (in the above example, 100% match), the removing module 434 may be configured to remove the current_words from current result, the adding module 436 may be configured to add (append) a new result with the new intersection words, the setting module 438 may be configured to set intersection_words count to be 1 plus the current_words count. Thus, the current result will now include as follows:

Result={"Red delicious apples are spoiled and need to be thrown away–Thread",2}

After that, the iteration module 440 may be configured to again iterate to the next line of the log file. For example, if the next line read by the reading module 422 now reads "oranges are spoiled and need to be thrown away," which appears, for example, in thread 19 of the log file, the parsing module 424 may again parse the line (thread 19) just read by the reading module 422 that includes "Oranges are spoiled and need to be thrown away" into word tokens of "Oranges," "are," "spoiled," "and," "need," "to," "be," "thrown," and "away" using space as delimiters and set them again as new_words. Since the determination module 430 determines that the current result is not empty, and includes an array of words called current_words and an appearance count of the array called current_words_count (e.g., Result={"Red delicious apples are spoiled and need to be thrown away–Thread", 2}, the designation module 432 may be configured to take an intersection of the current_words from the current result and the new_words and may be configured to designate the intersection words as intersection_words. In this case, among the current_words in the current result ("Red delicious apples are spoiled and need to be thrown away"; total of 11 words) and the new_words ("Oranges are spoiled and need to be thrown away"), the intersection_words are "are," "spoiled," "and," "need," "to," "be," "thrown," and "away" (total of 8 words) which is about 73% match (8/11; 8 words in the intersection words and 11 words in the current result) with the current_words in the current result. In this case, when the determination module 430 determines that the intersection_words is equal to or more than a predetermined percentage (i.e., 70%) match with the current_words (in the above example, 73% match), the removing module 434 may be configured to remove the current_words from results, the adding module 436 may be configured to add (append) a new result with the new intersection_words, the setting module 438 may be configured to set intersection words count to be 1 plus the current_words_count. Thus, the current result will now include as follows:

Result={"are spoiled and need to be thrown away–Thread",3}

According to exemplary embodiments, by executing the above described summarization algorithm, the LFPM 406 may be configured to dynamically and automatically summarize contents of log files that may include millions of lines and thousands of warnings and errors with various parameters within milli seconds or few seconds and generate, e.g., a four line summary onto the GUI 420.

FIG. 5 illustrates a graphical user interface (GUI) that displays a summarized reduced data file generated by a log file processing module in accordance with an exemplary embodiment.

Referring to FIGS. 4 and 5, the following is an example where 17 Warnings, Errors and Fatals from contents of the log files are summarized into 4 lines by the LFPM 406 by utilizing "space" as delimiters and 75% as predetermined percentage for match.

--- includeTag;INFO;WARN;Show Warnings as INFO
includeTag;WARN;ERROR;Show Errors as Warnings
includeTag;ERROR;FATAL;Show Fatals as Errors
Warning 2018/06/09-12:41:11 : Red Delicious apples are spoiled and need to be thrown away - Thread 1
Warning 2018/06/09-13:32:12 : Red Delicious apples are spoiled and need to be thrown away - Thread 2
Warning 2018/06/09-12:41:11 : Red Delicious apples are spoiled and need to be thrown away - Thread 1
Warning 2018/06/09-13:32:12 : Red Delicious apples are spoiled and need to be thrown away - Thread 2
Warning 2018/06/09-15:10:46 : Red Delicious apples are spoiled and need to be thrown away -Thread 1
Warning 2018/06/09-16:50:15 : Gala apples are spoiled and need to be thrown away - Thread 2
Warning 2018/06/09-17:44:36 : Oranges are spoiled and need to be thrown away - Thread 19
Warning 2018/06/09-18:43:26 : Oranges are spoiled and need to be thrown away - Thread 15
Warning 2018/06/09-19:20:16 : MacInTosh apples are spoiled and need to be thrown away - Thread 3
Warning 2018/06/09-20:41:26 : MacInTosh apples are spoiled and need to be thrown away - Thread 4
Error 2018/06/09-23:23:45 : Null Pointer Exception with Process A
Error 2018/06/10-00:41:24 : Null Pointer Exception with Process B
Fatal 2018/06/10-01:23:26 : Unable to complete task. System [345829::AA] shutdown unexpectedly
Fatal 2018/06/10-05:43:46 : Unable to complete task. System [238900::RW] shutdown unexpectedly
Fatal 2018/06/10-06:13:56 : Unable to complete task. System [290123:WQ] shutdown unexpectedly
Info 2018/06/09-06:41:11 : Red Delicious apples are good - Thread 1
Info 2018/06/09-07:32:12 : Red Delicious apples are good - Thread 2
Info 2018/06/09-08:20:16 : MacInTosh apples good - Thread 3
Info 2018/06/09-09:41:11 : Red Delicious apples are spoiled and need to be thrown away - Thread 1
Info 2018/06/09-10:32:12 : Red Delicious apples are spoiled and need to be thrown away - Thread 2
Info 2018/06/09-11:20:16 : MacInTosh apples are spoiled and need to be thrown away - Thread 3
Warning 2018/06/10-09:47:16 : Indirect conversion from String to Long between Objects A and B
Warning 2018/06/10-11:14:06 : Indirect conversion from String to Long between Objects P and R -continued

```
RESULT
[2018/06/10-01:23 - 2018/06/10-06:13]   ERROR   3 occurrences of: Fatal : Unable to
complete task. System shutdown unexpectedly
[2018/06/09-23:23 - 2018/06/10-00:41]   WARN    2 occurrences of: Error : Null Pointer
Exception with Process
[2018/06/09-12:41 - 2018/06/09-20:41]   INFO    10 occurrences of: Warning : are spoiled
and need to be thrown away - Thread
[2018/06/10-09:47 - 2018/06/10-11:14]   INFO    2 occurrences of: Warning : Indirect
conversion from String to Long between Objects and
```

The above result has been illustrated by the GUI 520 which shows the result 522 as summarized above into four lines. According to exemplary embodiments, by executing the above described summarization algorithm, the LFPM 406 may be configured to dynamically and automatically summarize contents of log files that may include millions of lines and thousands of warnings and errors with various parameters within milli seconds or few seconds and generate, e.g., a four line summary (result 522) onto the GUI 520.

According to exemplary embodiments, a manual of other capabilities that may allow the LFPM 406 to become customizable as well as may make the application useful for a start-of-day-checkout. For example, there may be a logic to handle date and time at the beginning of the line as that may be standard logger behavior. Although in the above-described summarization algorithm, the LFPM 406 was set in a manner that it requires no knowledge of the lines in the log file, however, one LFPM 406 may be configured to receive commands or user inputs which may override the default behavior via regular expressions. According to exemplary embodiments, the result 522 generated by the LFPM 406 may be emailed to one or more of the users of the client devices 308(1)-308(n), but the disclosure is not limited thereto. The result 522 may also be communicated to one or more of the users of the client devices 308(1)-308(n) via other mechanisms, e.g., text messaging.

According to exemplary embodiments, PROPERTIES FOR LOG FILE SUMMARY may include, but not limited to, the following:

```
LOG DIRECTORY:
    logDirectory;<PATH>;<FILENAME PATTERN>;<HOURS>;[COMMENT]
DESCRIPTION:
    <PATH>
    Location of log directory
    <FILENAME PATTERN>
      Type/Name of log files to retrieve from specified log directory
    <HOURS>
      Retrieve log files that were modified within HOURS from current time
    in log directory. Default = 24
NOTE:
  You may have multiple logDirectory lines in the property.
EXAMPLES:
    logDirectory;logdir/error_logs;*.txt;5.5; Want error .txt logs
    logDirectory;logdir/error_logs;*.log;48; Want error .log logs
    logDirectory;logdir;logFile-1.txt;13.5; Only want logFile-1.txt
    logDirectory;logdir;*.txt;; Use default HOURS = 24 value
INCLUDE TAGS / EXCLUDE TAGS:
    excludeTag;<TYPE TO EXCLUDE>;[COMMENT]
    includeTag;<REPORTING LEVEL>;<TYPE TO INCLUDE>;[COMMENT]
DESCRIPTION:
    <TYPE TO EXCLUDE>
      Exclude Log line type/phrase in summary. NOT CASE SENSITIVE
    <REPORTING LEVEL>
      ERROR or WARN or INFO. Only specify for includeTag. CASE
    SENSITIVE
    <TYPE TO INCLUDE>
      Include Log line type/phrase in summary. NOT CASE SENSITIVE
NOTE:
      ORDER DEPENDENT. Top TAG has more Priority
EXAMPLES:
      To INCLUDE Error first, then EXCLUDE Info:
      includeTag;ERROR;Error; Including Error is important
      excludeTag;Info; Excluding Info from Summary
EMAIL:
      email<PropertyName>;<VALUE>;[COMMENT]
DESCRIPTION:
  REQUIRED EMAIL PROPERTIES:
      emailToAddress;<TO ADDRESS-1,TO ADDRESS
    2,...>;[COMMENT]
        Comma separated list of addresses. First address considered as
    from email address.
  OPTIONAL EMAIL PROPERTIES:
      emailCcAddress;<CC ADDRESS-1,CC ADDRESS-2,...>;[COMMENT]
        Comma separated list of addresses
      emailBccAddress;<CC ADDRESS-1,CC ADDRESS-2,...>;[COMMENT]
        Comma separated list of addresses
```

```
    emailSubjectPrefix;<HOST NAME>; <SUBJECT PREFIX>;[COMMENT]
       Edit email subject by adding a prefix based on host name of system
    DEFAULT EMAIL PROPERTIES (CUSTOMIZABLE):
       emailDaysToEmailGreen;Sun; NOT CASE SENSITIVE
       emailMailHost;mailhost.jpmchase.net;
       emailMailPort;25;
       emailMaxLines;1000;
    NOTE:
       Emails are classified into three types:
          RED:   Errors present in Log Files / Scripts
          AMBER: No Errors, but Warnings present in Log Files / Scripts
          GREEN: No Errors or Warnings. Only emailed on Sundays unless
specified
    EXAMPLES:
       emailToAddress;to1@email.com, to2@email.com; COMMENT: to1@email.com
considered as from address
       emailSubjectPrefix;host1; PROD 1 of 2;
       emailSubjectPrefix;host2; PROD 2 of 2;
       emailDaysToEmailGreen; Sun, Mon, Wed;
       emailMaxLines;1500;
```

According to exemplary embodiments, OPTIONAL PROPERTIES FOR LOG FILE SUMMARY may include, but not limited to, the following:

```
SCRIPT PROCESSING:
   script;<SCRIPT PATH>;[ARGUMENTS SEPARATED BY SPACE];[COMMENT]
DESCRIPTION:
   <SCRIPT PATH>
      Location of .sh script
   [ARGUMENTS SEPARATED BY SPACE]
      Optional arguments for script separated by space
UBERMONITOR SCRIPTS: Sets ERRORS and WARNINGS environment variables based
on result
   checkCPU.sh <WARNING_LIMIT> <ERROR_LIMIT>
      Checks CPU usage against provided WARNING and ERROR limit
   checkDiskSpace.sh <DIRECTORY PATH> <WARNING_LIMIT>
<ERROR_LIMIT>
      Checks Disk Space for specified directory against provided WARNING and
ERROR limit
   checkMemoryUsage.sh <WARNING_LIMIT> <ERROR_LIMIT>
      Checks Memory usage against provided WARNING and ERROR limit
   checkProcesses.sh; <SUPER_USER> <PROPERTY_FILE>
     Checks that processes are running and checks for processes that are NOT being
monitored.
SETTING ENVIRONMENT VARIABLES:
   WINDOWS:
      set ERRORS=0
      set WARNINGS=0
   LINUX:
      export ERRORS=0
      export WARNINGS=0
EXAMPLES:
   script;scripts/checkCPU.sh;75 90;
   script;scripts/checkDiskSpace.sh;/var/tmp 75 90;
   script;scripts/checkMemoryUsage.sh;75 90;
   script;scripts/checkProcesses.sh;a_scpp;checkProcesses.properties
   script;scripts/test.sh;; This script does not take any arguments
MINIMUM OCCURRENCE THRESHOLD:
   summaryMinOccurrence;<LOG MSG OR PHRASE>;<MINIMUM OCCURRENCE
LIMIT>;[COMMENT]
DESCRIPTION:
   <LOG MSG OR PHRASE>
      Log msg/phrase to ignore in summary if it occurs less than specified threshold
limit
   <MINIMUM OCCURRENCE LIMIT>
      Only lines with count >= MINIMUM OCCURRENCE LIMIT will be
included in Log Summary
EXAMPLES:
   summaryMinOccurrence;Error connecting;10;Ignore msg if count < 10
   summaryMinOccurrence;Exception occurred with;20;
TIMESTAMP PROCESSING:
   timestamp;<(TIMESTAMP REGULAR EXPRESSION)>;[COMMENT]
```

-continued

DESCRIPTION:
  <(TIMESTAMP REGULAR EXPRESSION)>
    Custom timestamp regular expression for parsing date/time strings from log line. May be enclosed in ( )
DEFAULT TIMESTAMP REGULAR EXPRESSIONS:
  (\d{4}[\-\/]([a-zA-Z]{3,}|\d{1,2})[\-\/]\d{1,2})[T\s\/;\-,:]\d{1,2}:\d{1,2}) --> 2018[/-][06|Jun|June][/-]26[T\s/;-,:]13:28
  (\d{1,2}[\-\/]([a-zA-Z]{3,}|\d{1,2})[\-\/]\d{4}[T\s\/;\-,:]\d{1,2}:\d{1,2}) --> 26[/-][06|Jun|June][/-]2018[T\s/;-,:]13:28
  ([a-zA-Z]{3,}\s\d{1,2}[,]\s\d{4}\s\d{1,2}:\d{1,2}:\d{1,2}\s[AP][M]) --> [Jun|June] 26, 2018 1:28:00 PM
  (([a-zA-Z]{3,}|\d{1,2})[\-\/]\d{1,2}[\-\/]\d{2}[T\s\/;\-,:]\d{1,2}:\d{1,2}) --> [06|Jun|June][/-]26[/-]18[T\s/;-,:]13:28
  (\d{1,2}:\d{1,2}) --> 13:28
EXAMPLES:
  timestamp;([a-zA-Z]{3}\s[a-zA-Z]{3}\s\d{1,2}\s\d{1,2}:\d{1,2}:\d{1,2}\s[A-Z]{3}\s\d{4}); Thu Feb 21 14:23:30 PST 2018
DELIMITER FOR TOKENIZATION:
  delimiter;<VALUES SEPARATED BY |>;[COMMENT]
DESCRIPTION:
  <VALUES SEPARATED BY |>
    Delimiters to use for splitting log file lines into tokens. DEFAULT is \s (space). CASE SENSITIVE
EXAMPLES:
  delimiter;\s; Space delimiter
  delimiter;\s|:|-; Space and : and - delimiters
REGULAR EXPRESSION FILTERING:
  summaryREGEX;<REPORTING LEVEL>;<REGULAR EXPRESSION>;[COMMENT]
DESCRIPTION:
  <REPORTING LEVEL>
    ERROR or WARN or INFO. CASE SENSITIVE
  <REGULAR EXPRESSION>
    REGULAR EXPRESSION for Log lines to include in summary.
  NOTE:
    This functionality occurs before INCLUDE TAG / EXCLUDE TAG (DEFAULT BEHAVIOR)
EXAMPLES:
  Say a log file has the following lines:
    WARN 2018/06/09 15:10:46 : Red apples are spoiled and need to be thrown away - Thread 1
    WARN 2018/06/09 16:50:15 : Gala apples are spoiled and need to be thrown away - Thread 2
    WARN 2018/06/09 17:44:36 : Oranges are spoiled and need to be thrown away - Thread 19
    WARN 2018/06/09 18:43:26 : Oranges are spoiled and need to be thrown away - Thread 15
  With Default Behavior of includeTag and excludedTag, the summary result will be:
    [2018/06/09 15:10 - 2018/06/09 18:43]    4 Occurrences Of WARN: are spoiled and need to be thrown away - Thread
  But, if you want detailed summarization, where you want to distinguish between Apples and Oranges:
    [2018/06/09 15:10 - 2018/06/09 16:50]    2 Occurrences Of WARN: apples are spoiled and need to be thrown away - Thread
    [2018/06/09 17:44 - 2018/06/09 18:43]    2 Occurrences Of WARN: Oranges are spoiled and need to be thrown away - Thread
    The above results can be achieved through:
      summaryREGEX;WARN;(\w*?\s)(are spoiled and need to be thrown away - Thread);Apples versus Oranges
  If you want to distinguish between Different Types of Apples and Oranges (and consider them as ERROR):
    [2018/06/09 15:10 - 2018/06/09 15:10]    1 Occurrences Of ERROR: Red apples are spoiled and need to be thrown away - Thread
    [2018/06/09 16:50 - 2018/06/09 16:50]    1 Occurrences Of ERROR: Gala apples are spoiled and need to be thrown away - Thread
    [2018/06/09 17:44 - 2018/06/09 18:43]    2 Occurrences Of ERROR: Oranges are spoiled and need to be thrown away - Thread
    The above results can be achieved through:
      summaryREGEX;ERROR;(?:\s:\s)(.*?)(are spoiled and need to be thrown away - Thread);Types of Apples & Oranges
      Explanation: ?: in (?:\s:\s) makes it a non-capturing group, where the pattern (\s:\s) will not be included in results According to exemplary embodiments, the processor may be further configured to: receive a plurality of log files from the database via the communication network; and dynamically and automatically summarize contents of all of the log files simultaneously by generating a reduced data file in a human readable format by automatically executing the summarization algorithm. The results may be displayed onto the GUI 420 or GUI 520.

According to exemplary embodiments, a non-transitory computer readable medium may be configured to store instructions for implementing the LFPM 406 for dynamically and automatically summarizing contents of a log file. According to exemplary embodiments, the instructions, when executed, may cause a processor embedded within the LFPM 406 or the LFPD 402 to perform the following: access a database that stores a plurality of log files each having one or more lines with keywords for searching common keywords of errors and warnings appearing in testing an application; and dynamically and automatically summarize contents of the log file by generating a reduced data file in a human readable format (e.g., result 522 as illustrated in FIG. 5) by automatically executing a summarization algorithm including: for each line of the log file, reading the line and parsing the line; creating word tokens from the parsed line by utilizing a series of delimiters and designating the word tokens from the parsed line as new_words; searching for a current result in results; when it is determined that the current result is not empty, and includes an array of words called current_words and an appearance count of the array called current_words_count, taking an intersection of the current_words from the current result and the new_words and designating the intersection words as intersection_words; when it is determined that the intersection_words is equal to or more than a predetermined percentage match with the current_words, removing the current_words from results; adding a new result with the new intersection_words; setting intersection_words count to be 1 plus the current_words_count; and iterating to the next line of log file. The processor may be the same or similar to the processor 104 as illustrated in FIG. 1 or the processor embedded within LFPD 202, LFPD 302, and LFPD 402.

According to exemplary embodiments, when it is determined that the intersection_words count is less than the predetermined percentage of the current_words, the instructions, when executed, may cause the processor 104 to further perform the following: add the new_words to the results; set the count to 1; and iterate to the next line of the log file.

According to exemplary embodiments, when it is determined that the current result is empty, the instructions, when executed, may cause the processor 104 to further perform the following: add the new_words to the results; set the count to 1; and iterate to the next line of the log file.

According to exemplary embodiments, the instructions, when executed, may cause the processor 104 to further perform the following: receive a plurality of log files from the database via the communication network; and dynamically and automatically summarize contents of all of the log files simultaneously by generating a reduced data file in a human readable format by automatically executing the summarization algorithm.

Figure 6:
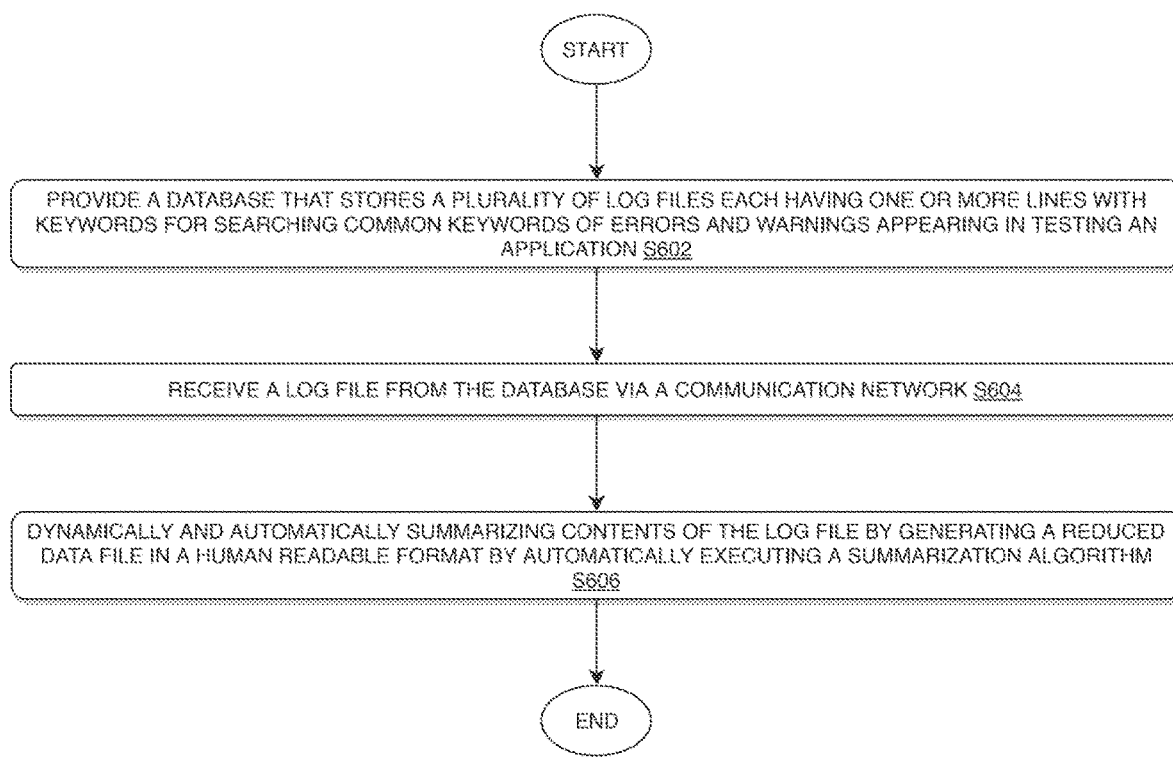
FIG. 6 illustrates a flowchart of an exemplary process for implementing a log file processing module in accordance with an exemplary embodiment.
Figure 7:
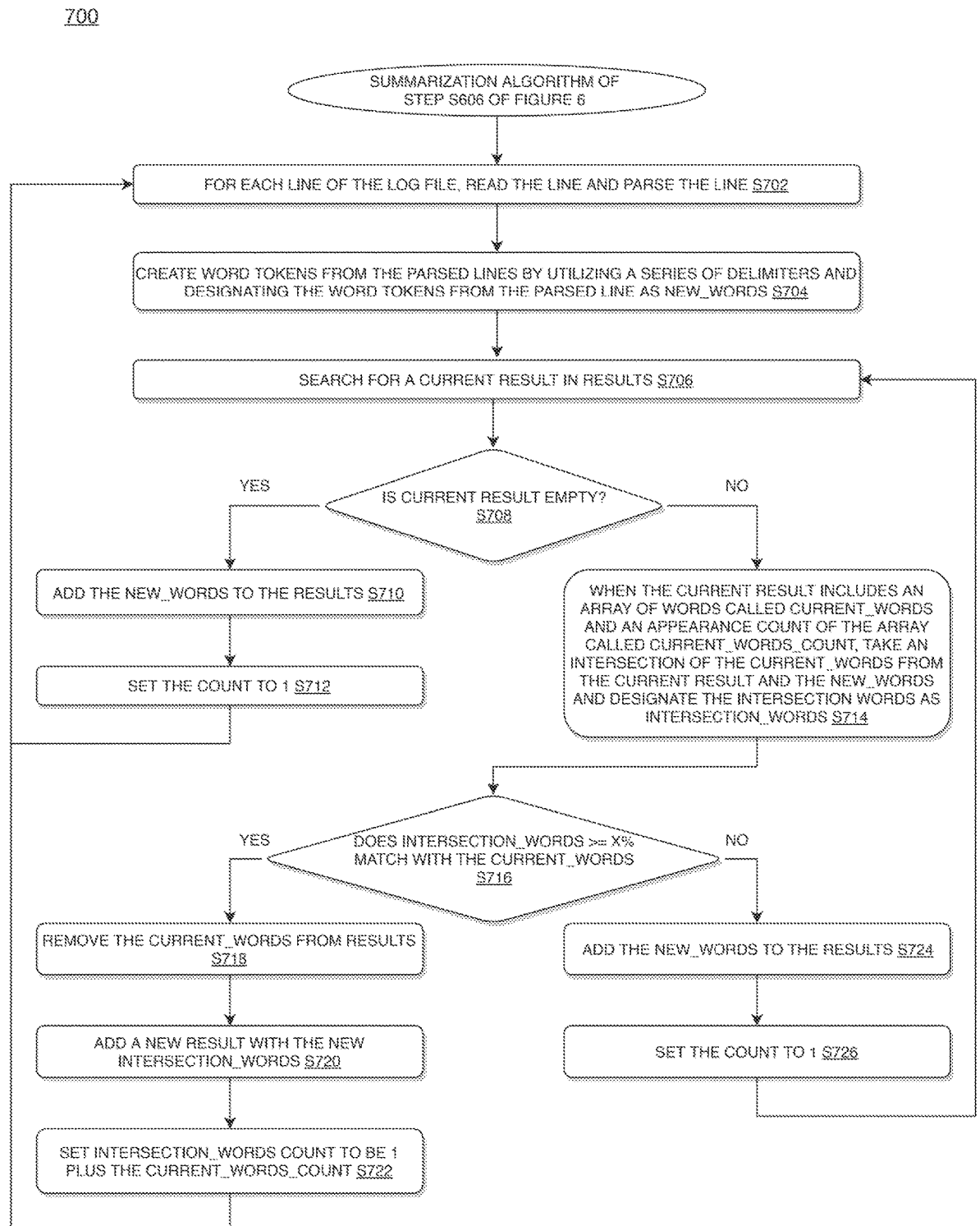
FIG. 7 illustrates a flowchart of an exemplary summarization algorithm of FIG. 6 in accordance with an exemplary embodiment.

FIG. 6 illustrates a flowchart of an exemplary process for implementing a log file processing module in accordance with an exemplary embodiment and FIG. 7 illustrates a flowchart of an exemplary summarization algorithm of FIG. 6 in accordance with an exemplary embodiment. The log file processing module may be the LFPM 306 as illustrated in FIG. 3 or the LFPM 406 as illustrated in FIG. 4.

In the process 600 of FIG. 6, at step S602, a database may be provided that stores a plurality of log files each having one or more lines with keywords for searching common keywords of errors and warnings appearing in testing an application.

At step S604, a log file may be received from the database via a communication network.

At step S606, the contents of the log file may be dynamically and automatically summarized by generating a reduced data file in a human readable format by automatically executing an exemplary summarization algorithm as described above with reference to FIGS. 3-5.

In the process 700 of FIG. 7, at step S702, for each line of the log file, a line from the log file may be read and parsed.

At step S704, word tokens may be created from the parsed line by utilizing a series of delimiters (e.g., space) and the word tokens from the parsed line may be designated as new_words. At step S706, a current result may be searched in results.

At step S708, it may be determined whether the current result is empty or not.

When it is determined at step S708 that the current result is empty, at step S710, the new_words may be added to the results, and at step S712, the count of the new_words may be set to 1, and then the process may proceed to step S702 to iterate to the next line of the log file.

When it is determined at step S708 that the current result is not empty, but includes an array of words called current_words and an appearance count of the array called current_words_count, at step S714, an intersection of the current_words may be taken from the current result and the new_words and the intersection words may be designated as intersection words.

At step S716, it may be determined whether the intersection_words exceeds a predetermined percentage of match words with the current_words.

For example, when it is determined at step S716 that the intersection_words is equal to or more than a predetermined percentage (i.e., 70%, but the disclosure is not limited thereto) match with the current_words, at step S718, the current_words may be removed from results; at step S720, a new result may be added to the results with the new intersection_words; at step S722, intersection_words_count may be set to be 1 plus the current_words_count and the process may proceed to step S702 to iterate to the next line of log file.

When it is determined at step S716 that the intersection_words is less than the predetermined percentage (i.e., 70%, but the disclosure is not limited thereto) match with the current_words, at step S724, the new_words may be added to the results; at step S726, the new_words count may be set to 1 and then the process may proceed to step S706 for searching again for a current result in results, and after that the process may proceed to step S702 to iterate to the next line of log file.

For example, according to exemplary embodiments, the process 700 may initially set all results to empty as: Result={null}. Then the reading module 422 may be configured to start reading each line of the log file at step S702. For example, if the reading module 422 reads a line that is not empty (null), the parsing module 424 may be configured to parse the words of the line by using "space" as delimiters at step S702. For example, if the reading module 422 reads a line that includes the words "Red delicious apples are spoiled and need to be thrown away" in thread 1 of the log file, the initial result will include as follows:

> Result={null}Red delicious apples are spoiled and need to be thrown away–Thread 1

Then, at step S704, the parsing module 424 may parse the line that includes "Red delicious apples are spoiled and need to be thrown away" into word tokens of "Red," "delicious," "apples," "are," "spoiled," "and," "need," "to," "be," "thrown," and "away" using space as delimiters. Since the initial result is empty, at step S710, the adding module 436 may add these word tokens as "new_words" to the results, and at step S712, the setting module 438 may set the appearance count of the new_words (array of the words "Red delicious apples are spoiled and need to be thrown away") to "1." Thus, the result will now include as follows:

Result={"Red delicious apples are spoiled and need
to be thrown away–Thread 1",1}

After that, the iteration module 440 may continue to iterate to the next line. For example, at step S708, when the determination module 430 determines that the current result is not empty, and includes an array of words called current_words and an appearance count of the array called current_words_count (e.g., Result={"Red delicious apples are spoiled and need to be thrown away–Thread 1", 1}, at step S714 the designation module 432 may be configured to take an intersection of the current_words from the current result and the new_words and may be configured to designate the intersection words as intersection_words.

For example, if the next line read by the reading module 422 again reads "Red delicious apples are spoiled and need to be thrown away," which appears in thread 2 of the log file, at step S704 the parsing module 424 may again parse the line just read by the reading module 422 from thread 2 that includes "Red delicious apples are spoiled and need to be thrown away" into word tokens of "Red," "delicious," "apples," "are," "spoiled," "and," "need," "to," "be," "thrown," and "away" using space as delimiters and set them again as new_words. Since at step S708 the determination module 430 determines that the current result is not empty, and includes an array of words called current_words and an appearance count of the array called current_words_count (e.g., {Result="Red delicious apples are spoiled and need to be thrown away–Thread 1", 1}, at step S714 the designation module 432 may be configured to take an intersection of the current_words from the current result and the new_words and may be configured to designate the intersection words as intersection_words.

In this above example, since there is a 100% match (meaning exactly the same words) with the current_words in the current result (Red delicious apples are spoiled and need to be thrown away) and the new_words (Red delicious apples are spoiled and need to be thrown away) generated after parsing the next line (thread 2 of the log file) at step S704, the intersection_words will also include the exact same words (Red delicious apples are spoiled and need to be thrown away). When at step S716 the determination module 430 determines that the intersection_words is equal to or more than a predetermined percentage (i.e., 70%) match with the current_words (in the above example, 100% match), at step S718, the removing module 434 may be configured to remove the current_words from current result, and at step S720, the adding module 436 may be configured to add (append) a new result with the new intersection_words, and at step S722, the setting module 438 may be configured to set intersection_words count to be 1 plus the current_words_count. Thus, the current result will now include as follows:

Result={"Red delicious apples are spoiled and need
to be thrown away–Thread",2}

After that, the process 700 may again iterate to the next line of the log file. For example, if the next line read at step S702 now reads "oranges are spoiled and need to be thrown away," which appears, for example, in thread 19 of the log file, at step S704, the parsing module 424 may again parse the line (thread 19) just read at step S702 that includes "Oranges are spoiled and need to be thrown away" into word tokens of "Oranges," "are," "spoiled," "and," "need," "to," "be," "thrown," and "away" using space as delimiters and set them again as new_words. Since at S708, the determination module 430 determines that the current result is not empty, and includes an array of words called current_words and an appearance count of the array called current_words_count (e.g., Result={"Red delicious apples are spoiled and need to be thrown away–Thread", 2}, at step S714, the designation module 432 may be configured to take an intersection of the current_words from the current result and the new_words and may be configured to designate the intersection words as intersection_words. In this case, among the current_words in the current result ("Red delicious apples are spoiled and need to be thrown away"; total of 11 words) and the new_words ("Oranges are spoiled and need to be thrown away"), the intersection_words are "are," "spoiled," "and," "need," "to," "be," "thrown," and "away" (total of 8 words) which is about 73% match (8/11; 8 words in the intersection_words and 11 words in the current result) with the current_words in the current result. In this case, at step S716, when the determination module 430 determines that the intersection_words is equal to or more than a predetermined percentage (i.e., 70%) match with the current_words (in the above example, 73% match), at step S718, the removing module 434 may be configured to remove the current_words from results, at step S720, the adding module 436 may be configured to add (append) a new result with the new intersection_words, and at step S722, the setting module 438 may be configured to set intersection_words count to be 1 plus the current_words_count. Thus, the current result will now include as follows:

Result={"are spoiled and need to be thrown away–
Thread",3}

According to exemplary embodiments, the process 600 of FIG. 6 and the process 700 of FIG. 7 may further include: receiving a plurality of log files from the database via the communication network; and dynamically and automatically summarizing contents of all of the log files simultaneously by generating a reduced data file in a human readable format by automatically executing the summarization algorithm.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method for implementing a log file processing module for dynamically and automatically summarizing contents of a log file by utilizing one or more processors and one or more memories, the method comprising:

receiving, via a communication network, a log file from a database that stores a plurality of log files each having one or more lines with keywords for searching common keywords of errors and warnings appearing in testing an application; and dynamically and automatically summarizing contents of the log file by generating a reduced data file in a human readable format by automatically executing a summarization algorithm including:

for each line of the log file, reading the line and parsing the line;

creating word tokens from the parsed line by utilizing a series of delimiters and designating the word tokens from the parsed line as new_words;

searching for a current result in results;

when it is determined that the current result is not empty, and includes an array of words called current_words and an appearance count of the array called current_words_count, taking an intersection of the current_words from the current result and the new_words and designating the intersection words as intersection_words;

when it is determined that the intersection_words are equal to or more than a predetermined percentage match with the current_words, removing the current words from results;

adding a new result with a new intersection_words; and setting intersection_words count to be 1 plus the current_words count.

2. The method according to claim 1, wherein, when it is determined that the intersection_words is less than the predetermined percentage match with the current_words, adding the new_words to the results;
setting the count of the new_words to 1; and
iterating to the next line of the log file.

3. The method according to claim 1, wherein the keywords comprise one or more of the following words appearing in testing the application: warning, error, fatal, and info.

4. The method according to claim 1, wherein, when it is determined that the current result is empty,
adding the new_words to the results;
setting the count of the new_words to 1; and
iterating to the next line of the log file.

5. The method according to claim 1, further comprising:
receiving a plurality of log files from the database via the communication network; and
dynamically and automatically summarizing contents of all of the log files simultaneously by generating a reduced data file in a human readable format by automatically executing the summarization algorithm.

6. The method according to claim 1, wherein the predetermined percentage is a value between about 70% to about 90% of the current words.

7. The method according to claim 1, wherein the predetermined percentage is about 75% of the current_words.

8. A system for implementing a log file processing module for dynamically and automatically summarizing contents of a log file, comprising:
a receiver configured to receive, via a communication network, a log file from a database that stores a plurality of log files each having one or more lines with keywords for searching common keywords of errors and warnings appearing in testing an application; and
a processor operatively coupled to the receiver and the database via the communication network, wherein the processor is configured to dynamically and automatically summarize contents of the log file by generating a reduced data file in a human readable format by automatically executing a summarization algorithm including:
for each line of the log file, reading the line and parsing the line;
creating word tokens from the parsed line by utilizing a series of delimiters and designating the word tokens from the parsed line as new_words;
searching for a current result in results;
when it is determined that the current result is not empty, and includes an array of words called current_words and an appearance count of the array called current_words_count, taking an intersection of the current_words from the current result and the new_words and designating the intersection words as intersection_words;
when it is determined that the intersection_words are equal to or more than a predetermined percentage match with the current_words,
removing the current_words from results;
adding a new result with a new intersection_words; and
setting intersection_words count to be 1 plus the current_words_count.

9. The system according to claim 8, wherein, when it is determined that the intersection_words is less than the predetermined percentage match with the current_words, the processor is further configured to:
add the new_words to the results;
set the count of the new_words to 1; and
iterate to the next line of the log file.

10. The system according to claim 8, wherein the keywords comprise one or more of the following words appearing in testing the application: warning, error, fatal, and info.

11. The system according to claim 8, wherein, when it is determined that the current result is empty, the processor is further configured to:
add the new_words to the results;
set the count of the new_words to 1; and
iterate to the next line of the log file.

12. The system according to claim 8, wherein the processor is further configured to:
receive a plurality of log files from the database via the communication network; and
dynamically and automatically summarize contents of all of the log files simultaneously by generating a reduced data file in a human readable format by automatically executing the summarization algorithm.

13. The system according to claim 8, wherein the predetermined percentage is a value between about 70% to about 90% of the current_words.

14. The system according to claim 8, wherein the predetermined percentage is about 75% of the current_words.

15. A non-transitory computer readable medium configured to store instructions for implementing a log file processing module for dynamically and automatically summarizing contents of a log file, wherein when executed, the instructions cause a processor to perform the following:
access a database that stores a plurality of log files each having one or more lines with keywords for searching common keywords of errors and warnings appearing in testing an application; and
dynamically and automatically summarize contents of the log file by generating a reduced data file in a human readable format by automatically executing a summarization algorithm including:
for each line of the log file, reading the line and parsing the line;
creating word tokens from the parsed line by utilizing a series of delimiters and designating the word tokens from the parsed line as new_words;
searching for a current result in results;
when it is determined that the current result is not empty, and includes an array of words called current_words and an appearance count of the array called current_words_count, taking an intersection of the current_words from the current result and the new_words and designating the intersection words as intersection_words;
when it is determined that the intersection words are equal to or more than a predetermined percentage match with the current_words,
removing the current_words from results;
adding a new result with a new intersection_words; and
setting intersection_words count to be 1 plus the current_words_count.

16. The non-transitory computer readable medium according to claim 15, wherein, when it is determined that the intersection_words is less than the predetermined percentage match with the current_words, the instructions, when executed, cause the processor to further perform the following:
add the new_words to the results;
set the count of the new_words to 1; and
iterate to the next line of the log file.

17. The non-transitory computer readable medium according to claim 15, wherein the keywords comprise one or more of the following words appearing in testing the application: warning, error, fatal, and info.

18. The non-transitory computer readable medium according to claim 15, wherein, when it is determined that the current result is empty, the instructions, when executed, cause the processor to further perform the following:
- add the new_words to the results;
- set the count of the new_words to 1; and
- iterate to the next line of the log file.

19. The non-transitory computer readable medium according to claim 15, wherein the instructions, when executed, cause the processor to further perform the following:
- receive a plurality of log files from the database via a communication network; and
- dynamically and automatically summarize contents of all of the log files simultaneously by generating a reduced data file in a human readable format by automatically executing the summarization algorithm.

20. The non-transitory computer readable medium according to claim 15, wherein the predetermined percentage is a value between about 70% to about 90% of the current_words.

\* \* \* \* \*